Oct. 11, 1955 M. G. CROSBY 2,720,583

DIVERSITY RECEIVING SYSTEM

Filed Dec. 6, 1950 3 Sheets-Sheet 1

Inventor

MURRAY G. CROSBY

By Lippincott & Smith,

Attorneys

Inventor
MURRAY G. CROSBY
By Lippincott & Smith
Attorneys

Oct. 11, 1955 M. G. CROSBY 2,720,583

DIVERSITY RECEIVING SYSTEM

Filed Dec. 6, 1950 3 Sheets-Sheet 3

Inventor
MURRAY G. CROSBY

By Lippincott & Smith,
Attorneys 2,720,583

DIVERSITY RECEIVING SYSTEM

Murray G. Crosby, Mineola, N. Y.

Application December 6, 1950, Serial No. 199,522
18 Claims. (Cl. 250—20)

This invention relates to diversity receiving systems of a type in which a plurality of receivers is connected to receive incoming signal energy through connection to antennas which are either spaced apart geographically or which have other characteristics tending to make the fading or response conditions on them generally different.

The invention is also directed to modulation apparatus which is useful in connection with systems of the foregoing type. Such apparatus, however, also is of such character as to have general application in the modulation field.

In a diversity receiving system it is usually customary to so arrange the circuits that the antenna providing the strongest signal is the one which contributes the predominant signal to the output. It is well established that the antenna on which the signal is faded is found to produce a relatively low amount of signal to the final output in systems of the nature of those to which the present invention is directed. This explains, in part at least, the reasons for choosing the antenna which is for the time being best from the standpoint of reception as the antenna to supply the signal received to the translating components. With this being done, it is inadvisable to permit those antennas in which the received signals are of faded intensity to contribute their degraded character signals to the final output because of the additional noise and distortion which cannot help but result therefrom.

While it is known that the signals received are subject to fading, the degree to which fading actually occurs in a system of the character to be set forth herein varies in an unpredictable manner. However, it is extremely unlikely that the signal will fade equally at all of the geographically-spaced antenna locations. This fact, of itself, provides a need for the system and methods herein to be disclosed for improving the quality of the signals used in the final translating devices to recreate the transmitted signal energy.

The invention herein to be set forth is further characterized as a diversity receiver having increased sensitivity of reception and involving a signal combination system of such selection characteristics that the superior signal predominates in the output. While the application of the invention is general, its ready adaptability to the various improved reception methods, such as the so-called exalted-carrier reception and single-sideband reception makes its usefulness particularly significant. Heretofore, as far as is known, systems of these types were so constituted that the conventional diode type of detection was not generally available. The result was that the audio frequency outputs of the detector on the several receivers had to be combined. However, signal combination of this form does not offer an inherent signal selection characteristic which is as favorable as that provided by the diode combination. This is mainly because of the effectiveness of the diode combination in rejecting the weaker signals. Illustratively, with a diode combination, if the weaker signal is 6 db weaker at its antenna terminals, it may contribute an output which is as much as 30 or more db down in the detector outputs. This fact at once suggests the desirability of the diode arrangement which is made possible of utilization with this invention.

In cases where the diode combination is not used and it is desired to combine the audio outputs of exalted-carrier or single-sideband or other types of receivers, the result is usually a simple addition of audio outputs without the desired selection properties in which the weaker signal is rejected.

In addition to the diode and audio combining systems above mentioned, other systems have been used in which a switching action selects the strongest signal and makes it available at an intermediate-frequency output which is fed to a single exalted-carrier detector. Such a system is described in U. S. Patent 2,441,661 granted to this applicant on May 18, 1948. However, a disadvantage might at times exist in such a prior art system in that if all of the receivers feed a single exalted-carrier detector the complete system could fail with the failure of one component. The system of the present invention consequently provides an added factor of safety in that, as described, three complete exalted-carrier receivers are feeding the output and the output will not fail until all three receivers have failed. A continuity-of-output safety factor is accordingly realized. In addition, if desired, the three receivers may be operated individually on three separate signals.

The invention herein to be described, therefore, may be considered to be directed generally to a radio receiving system wherein the rejection of the weaker signal is accomplished in a manner which is more efficient than that to be had with conventional diode combinations heretofore used.

The general principle upon which this invention is based is that of receiving at a plurality of geographically spaced locations signals from a remote transmitting point on diversity receiving apparatus. At the various receiving points the carrier frequency voltage is recreated in such a manner that it varies in strength, for instance, in accordance with the signal or carrier strength being received.

Various methods of creating the carrier frequency voltage at receiving points may be utilized or, in some instances, a combination of various methods. One suitable manner of obtaining the carrier frequency voltage is through the carrier filter of the exalted-carrier or single-sideband receiver of known characteristics. This produced carrier may be considered to vary in amplitude or strength under conditions instantaneously obtaining at each selected receiver location. In another form of receiver apparatus the carrier may be developed or created by utilizing a local oscillator whose amplitude may be appropriately controlled in proportion to the strength of the incoming signal wave. The received carrier modulation signals are locally detected to produce modulation frequency voltages indicative of the signal modulation. These modulation frequency voltages are then utilized to modulate the locally produced or created carrier frequency. There is thus generated at the various receiver points a new amplitude-modulated wave which may be detected in more or less conventional diode combination manner.

While various ways may be utilized to develop the carrier frequency locally, as well as to provide the modulation signals accompanying the incoming carrier, the newly created modulated wave may be considered, illustratively, to be generated by utilizing the detected audio frequency output obtained from an exalted-carrier or single-sideband receiver, as above noted, the side bands of modulation are effectively removed directly from the incoming signal available at the different receiving antennas. The result is that a carrier frequency voltage which may again be used as an unmodulated carrier is developed from the filter which then may be regarded as a local source of carrier. In this manner, the developed unmodulated carrier so created at the receiving point fades in direct accordance with the fading on the particular antenna and receiver from which it is derived.

Where the carrier is generated at the receiving points wholly by local oscillator means and without regard to the actual signal being received its strength should be independently controlled in accordance with the signal or carrier strength. This control may be of such a character that it acts, as does an automatic volume control, to produce a control signal which is a measure of conditions obtaining at the particular time. The control will operate, however, not to maintain the level but to vary the local oscillator strength in accordance with the signal or carrier strength. In either instance the locally-created carrier frequency, when modulated by the derived modulation frequencies, produces a new amplitude modulation wave which varies in signal strength in accordance with the fading of the signal. The modulation amplitude applied thereto is, however, established by the generally pure output of the exalted-carrier or single-sideband receiver so that each receiving point reconstructs amplitude modulated signals having a strength proportional to the separate signal strengths, and an amplitude modulation proportioned in degree to the output of the selected form of detector. These developed amplitude modulated carriers then may be detected by detector combinations, such as the herein described diodes, whose outputs are combined in the signal utilization circuit.

As a further application of the invention the general principles herein to be described are applicable also to both the upper and lower sideband outputs of a single-sideband receiver. The result is that a combined output is obtainable from both the upper sideband and the lower sideband.

A suitable modulating device for practicing the invention may be considered to comprise a plurality of thermionic devices all having a common cathode connection with the cathodes grounded through a resistance which may be of relatively high value as compared, for instance, to the tube impedance. Modulation input signals may be applied on one of the tubes to produce a variance in cathode potential which follows the modulation. Carrier frequency voltage input is applied to a second of the tubes so that the cathode potential of this tube varies with the carrier input and modulation applied to the previous tube. The third tube of the modulator has its cathode potential varied in accordance with the rise and fall of cathode potential of all tubes relative to a fixed point (such as ground). There may be applied to an input electrode of this third tube, for instance, a voltage which represents a reduced amplitude of the carrier input or, in the alternative, the third tube may operate with a grounded grid. In either instance the effect obtained is as if there were a phase reversal of the carrier applied to the third tube with respect to the second tube so that in an output circuit connected to this third tube there will be available the modulated wave output representative of the carrier frequency recovered, as modified in amplitude by the modulation signals derived from the removal of the sideband modulation from the incoming signal. This is the modulated signal voltage which may then be applied to the diode detector of known character.

In accordance with the foregoing, it becomes an object of this invention to provide ways and means of diversity reception wherein a more efficient selection of the strongest signal received will be obtained. A further object of the invention is to provide a diversity receiving system in which higher selection characteristics are obtained.

A further object is to provide an amplitude modulator of the desired type to apply to the diversity combining system. This modulator, as will be described, has characteristics of low inherent distortion and the ability to provide an amplitude-modulated wave with an output which is directly proportional in amplitude to the amplitude of the applied carrier wave. This is somewhat at variance with the usual conventional amplitude modulators where in order to obtain low distortion, the conventional amplitude modulators, such as the plate-modulated triode, require a saturation of input amplitude.

Such a conventional modulator will not produce an output amplitude proportional to the carrier input amplitude.

Other objects of the invention are those providing a novel modulation device for modulating a suitable carrier frequency or, in the alternative, their recovering from a suitable modulated frequency the sideband frequencies producing the modulation.

Still other objects and advantages of the invention are those providing a diversity receiving system of increased efficiency with respect to those heretofore known in the art, as well as to provide a diversified receiving system of simplified character both from the standpoint of its included components and its operating efficiency. Other objects of the invention and further advantages thereof will become apparent from a consideration of the following description and claims when read in connection with the accompanying drawings wherein:

Figure 1:
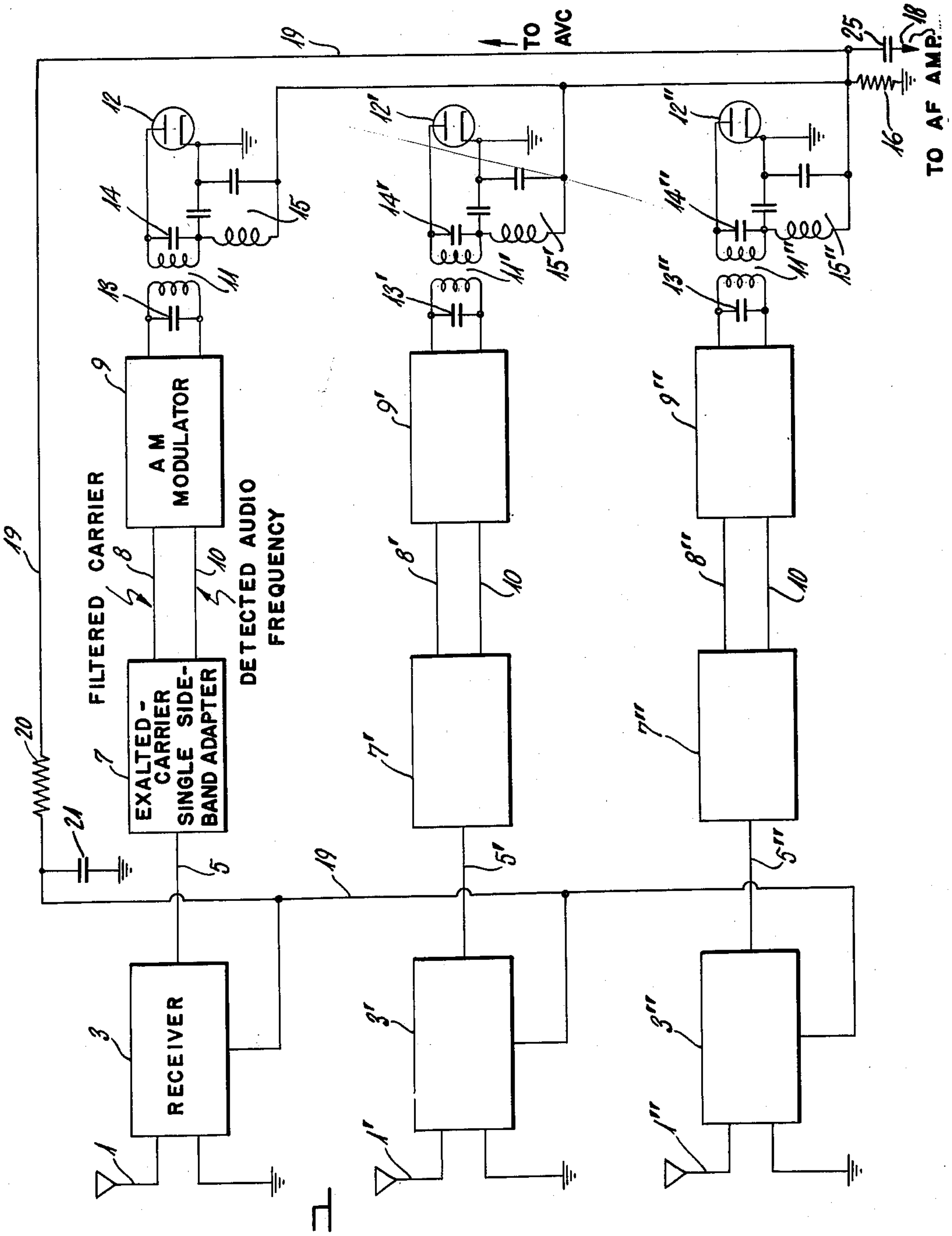
Fig. 1 is a diagrammatic illustration of one form of receiver system in accordance with this invention.

Making reference now to the drawings for a further understanding of this invention, three separate receiving antenna elements, 1, 1' and 1'', are assumed to be geographically spaced from each other by suitable distances, and are indicated as being arranged to receive signals from any suitable point of transmission (not shown). Generally speaking, it has been found satisfactory for the operation of diversity receiving methods to space the various antenna elements by distances of the general order of 1,000 feet with respect to each other. It is to be appreciated, however, that other arrangements such as antenna polarization may also provide the desired relative fading characteristics. The important factor is that the signals received from a transmitting point have different characteristics when received upon one antenna with respect to some other antenna.

It will become apparent from an observation of the drawings that the signals received on the antennas 1' and 1'' may be passed through receiver instrumentalities, as well as other circuit components, which correspond substantially in function and design to those used with respect to the signals received upon the antenna 1. Hence, for simplicity of reference, the second and third channels for signal reception will be provided with reference numerals corresponding to those of the first channel, but will be designated by either a ' (prime) or '' (double prime) exponent to show the desired relationship. Detailed reference therefore will be made in this description only to the signals received on one of the channels connected to receive signals from antenna 1, up until the point where the outputs of the various channels are combined.

The receiver unit 3 for the assumed first signal channel may be assumed to incorporate the usual and well-known radio frequency amplifiers, a suitable local oscillator and converter, as well as suitable intermediate frequency ampifiers and controlling instrumentalities. These components are so well known in the art that reference in detail thereto is considered wholly unnecessary. The intermediate frequency output from the receiver 3 is supplied by way of conductor 5 to an exalted-carrier or single-sideband adapter unit 7. This adapter unit functions to provide detection of the thereto supplied incoming signal wave. It has the advantage of exalted-carrier detection and provides for reduction of harmonics and cross-modulation distortion, which is brought about by multipath propagation characteristics. Where a single-sideband receiver is used, two channels of output may become available, as will be explained in connection with Fig. 2. These channels comprise the upper and lower sideband outputs. The circuit diagram of Fig. 1 shows essentially an arrangement adapted to a single channel of single-sideband reception, as well as to a receiver wherein use is made of the exalted-carrier type of receiver. The receiver components diagrammatically shown by the unit 7 may comprise any form of single-sideband receiver, such as are well known in the art, and described in both the patented and published literature. Reference to this general type of reception is also made, for instance, in the text entitled "Radio Engineering" by Dr. F. E. Terman, published by McGraw-Hill Book Co., Inc., New York, 1947, third edition. One type of exalted-carrier receiver, illustratively, may be considered as that which is disclosed in an article published by this applicant in the "Proceedings of the Institute of Radio Engineers," vol. 33, No. 9, for September, 1945, commencing at page 581 and continuing through page 591, reference to which is incorporated into this description. The filtered carrier frequency derived from the carrier filter of the exalted-carrier or single-sideband adapter 7 is then supplied by way of the line 8 to the amplitude modulator unit 9. This filtered carrier is derived from the filtered carrier channel before the usual limiting is applied, as explained in the mentioned "Proceedings of the Institute of Radio Engineers," illustratively. Accordingly, it will be appreciated that the carrier component obtained feeds in accordance with the feeding of the incoming signals, so that with this adding of the signal input at the various antenna elements 1, 1' and 1'' and so on, the carrier will be of different value. Where the carrier component is obtained from a purely local source, as contrasted to the exalted-carrier filter, for instance, it is, as above noted, controlled in its amplitude in accordance with the signal strength received. However, the principles of operation herein set forth are generally applicable without respect to the precise manner by which the carrier frequency is created or derived locally.

A connecting line 10 supplies the audio output as detected in the exalted-carrier single-sideband adapter unit 7 from that unit as a modulating wave into the amplitude modulator 9. At this point in the circuit the amplitude modulator 9 has been shown only diagrammatically. The unit serves to modulate the developed filtered carrier as available on the conductor 8 by the detected audio frequency signals which are available upon the conductor 10. One particularly satisfactory form for such amplitude modulator is shown and will be described in detail in connection with Fig. 3. Suffice it to say, therefore, at the moment, that the output of the amplitude modulator 9 appears in the transformer 11 as a wave modulated in amplitude to some selected degree which may, illustratively, be of the order of 30%. The transformer 11 has its primary and secondary appropriately tuned to the carrier frequency, as indicated. The lower value of the assumed 30% modulation is utilized to reduce the distortion which may appear on higher modulation percentages in diode detection, and, further, it has been found that this lower percentage modulation also may improve the diode selection action of the diode diversity combining system.

In general, it may be stated that the amplitude modulator unit 9 has a characteristic which is generally different from that of the usual amplitude modulator. This comes about in the provision of ways and means to provide for modulation of a variable amplitude carrier. It is important that the amplitude modulator unit 9 for the diversity receiver system shall provide an amplitude-modulated wave in which the percentage of modulation is dependent upon the amplitude of the modulation source, rather than upon the carrier amplitude. The amplitude of the modulated wave which appears at the output of the modulator 9 and becomes available in the transformer 11 must be, however, directly proportional to the amplitude of the carrier source applied to the modulator from the filtered carrier. These features will be explained more fully, as above noted, in the discussion of Fig. 3, but it is important to bear in mind the now-mentioned characteristics of the system in consideration of the operation of the detecting system to be set forth.

The transformer 11 has a bandpass characteristic which is appropriate to supply the modulated output of the modulator 9 to the diode element 12 for detection. This is provided by the tuning obtainable with the shunting capacity elements 13 and 14 in the transformer primary and secondary circuits respectively. A suitable low pass filter combination generally designated as 15 is also connected with the diode 12 in order to remove any remaining intermediate frequency components from the detected output of the diode. The diode output is then available across a resistor element 16 connecting at 17, for instance, to a point of fixed potential, such as ground. The output signals from the diode 12 are fed across this output resistor 16 through a conductor 18 and coupling condenser to suitable audio frequency amplifier units (not shown) but which are of any conventional variety commonly used for receiver instrumentalities. This output resistor 16 also has connected to it in parallel with the output of diode 12 also the outputs from the illustrated diodes 12' and 12'' of the second and third receiving paths. Thus, resistor 16 serves as a common output resistor for all channels to combine the outputs from the several diodes in conventional manner for diversity reception.

It will be noted that across the output resistor 16 there is also available automatic volume control (AVC) potentials which may be fed back by way of the conductor 19 through time-constant network 20, 21, to the radio frequency and intermediate frequency amplifier components of the receiver elements generally designated as 3 in this figure. The signal voltages available on the conductor 19 are the usual and well-known AVC potentials, in which the amplification of the various receivers will serve to be controlled by the stronger signal received.

As is well known in the art in connection with diversity reception, suitable meters and switching circuits may be provided continuously to indicate the diode current contributed by each receiver, as well as the combined diode current and the audio frequency outputs. These switching circuits are usually so arranged that the receivers may be operated singly for monitoring and tuning purposes, and may then be switched to the common resistor for diversity reception conditions. For simplicity of illustration, these types of switching components and indicators are not shown, but it may be assumed that the arrangement is generally of the type which is well known.

In some methods of diversity combination, efforts have been made to combine only the audio frequency outputs. These systems have utilized a direct addition of such audio frequency output signals. It might be mentioned that where this practice is followed, two signals which are 6 db apart in signal intensity would also be 6 db apart in output amplitude, illustratively. In addition, if this practice be followed, the weaker signal may contribute its noise to the combined output in such a way that the true and full advantages of the diversity reception will not be obtained. Further, it has been found from experimentation that with this type of diode detection a 6 db difference in signal intensities is sufficient to practically eliminate the weaker of the two signals from the audio output.

The foregoing description has assumed the reception of amplitude-modulated signals, but it should be pointed out that the invention is equally applicable to phase or angle modulation reception as well. Where recourse is had to phase modulation methods, for instance, the adapter unit 7 would produce and provide the detected output of the phase modulation detector on the conductor 10. The result would be that in the modulator unit 9 there would be a conversion from the signal received on the antenna 1 as a phase-modulated wave to an amplitude-modulated wave which would be available in the transformer 11 to be supplied to the diode 12 for detection and combination with the signals from the other channels. The method of recovering the detected audio frequency of the filtered carrier as available on the conductors 10 and 8 respectively is well known in connection with phase and angle modulation methods, and therefore no further description herein is believed to be necessary. Suffice it to say, for the purpose of describing this invention, as set forth in the diagrammatic showing of Fig. 1, that the signals received are passed through the receiver components into the adapter units wherein both the carrier energy and detected audio modulation frequencies are recovered. Then, through the aid of the modulator component 9, the recovered carrier frequency is amplitude-modulated by the detected audio energy to provide the signal which is to be detected by the diodes. As already noted, the diode outputs are combined for the purpose of being fed to the audio frequency amplifiers of the composite system and for providing the AVC voltages which are to be used to control the system operation.

Figure 2:
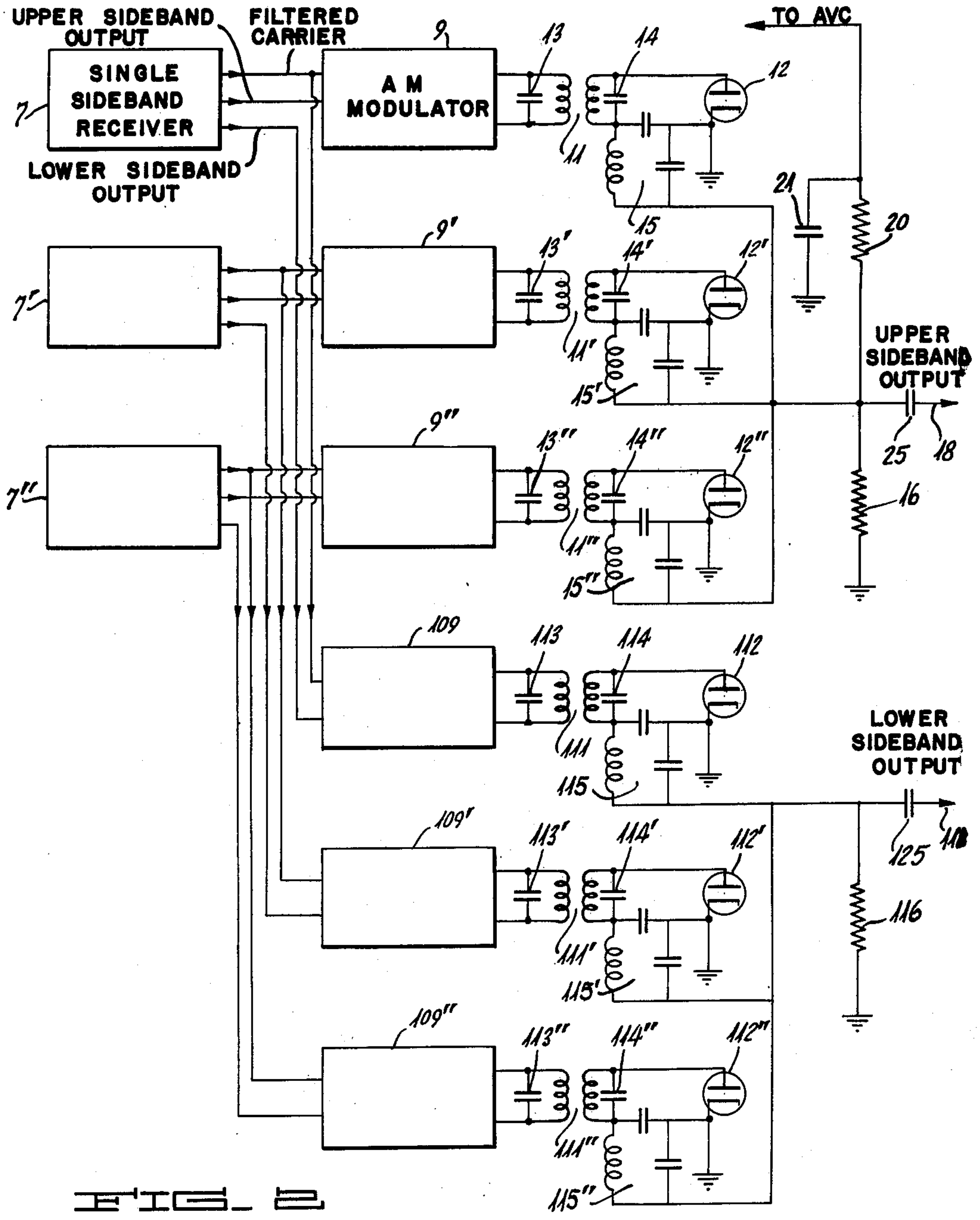
Fig. 2 is a diagrammatic illustration of a modification of the circuit of Fig. 1 to show the operation for recovering signals of both the upper and lower sidebands.

Modification of the invention shown by the circuit diagram in Fig. 2 is for the purpose of illustrating the application of the principles herein outlined to the reception of both the upper and the lower sideband outputs. Particularly for purposes of illustration, the components diagrammed by Fig. 1 may be considered to represent the upper single-sideband output, although from the standpoint of disclosure of operating principles they could just as well represent the lower sideband output. In the showing of Fig. 2, and assuming that the components of Fig. 1 illustrate the upper single-sideband output, the component of Fig. 2 functioning to operate under the control of the assumed lower sideband output will be provided with numbers identical to those of Fig. 1, increased by a unit of 100. Under these circumstances, it becomes desirable to provide a separate amplitude modulator and diode system for the second sideband output, as shown. Further, it will be noted from the showing of Fig. 2 that the assumed lower sideband output as fed through the modulators 109, 109′ and 109″ respectively feeds associated transformers 111, 111′ and 111″. Finally, the signal output is supplied across a common output resistor 116, so that the lower sideband output becomes available to instrumentalities connected to derive signals through the blocking condenser 125. It is interesting to note in this connection that the operation is usually of such form that the automatic volume control voltages available across the output resistor 16, as in Fig. 1, are derived only from one of the sideband outputs, herein assumed to be the upper. However, the twin single sideband system may be operated in such a manner as to select both the upper and the lower sideband outputs from the particular receiver providing the strongest carrier component.

Figure 3:
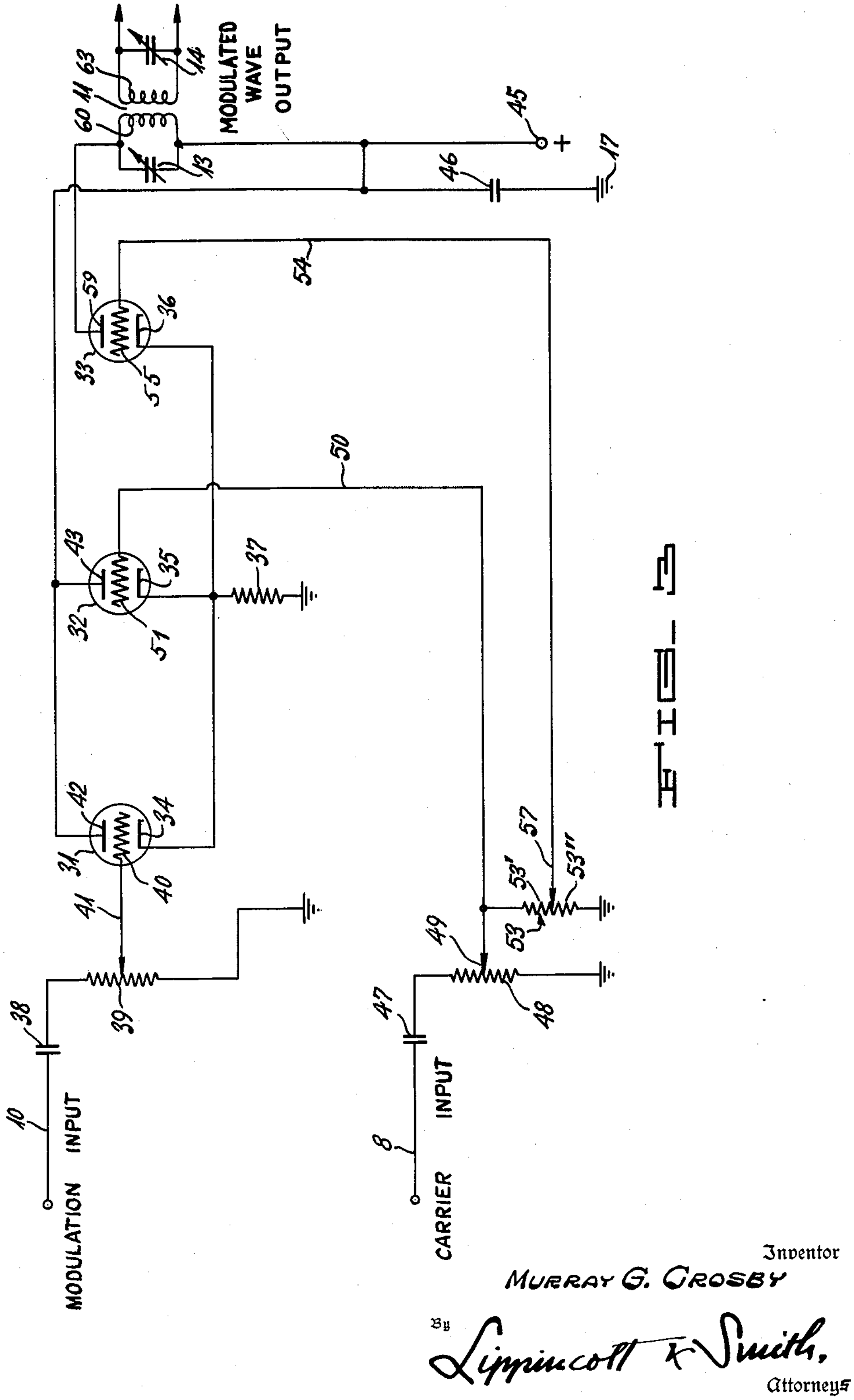
Fig. 3 is a circuit diagram of one suitable form of modulator usable in connection with the circuits diagrammed in either Fig. 1 or Fig. 2.

Reference may now be made to the showing of Fig. 3 for a description of the modulator component such as that shown by 9, for instance, in Fig. 1. In Fig. 3 the carrier input which is available on the conductor 8, for instance, is supplied as one of the controlling voltages. Similarly, the detected audio frequency serving as the modulation input which is available upon the conductor 10 of Fig. 1 provides the second input to the control system. Essentially, the modulator as described by Fig. 3 comprises three tubes, 31, 32 and 33, which each have their cathode electrodes 34, 35 and 36 tied together and connected to a point of fixed potential, such as ground 17, through the common cathode resistor 37. In this instance the tubes 31, 32 and 33 are illustratively represented as triodes and as being contained within individual envelopes. It is, however, to be pointed out that this showing is particularly illustrative in that the tubes may readily be triodes, tetrodes or pentodes and, while a single envelope has been shown for each individual component, it is to be understood that this is merely for convenience in showing. Multipurpose tubes in which two or more components are contained within the same envelope may be utilized where desired. Likewise, in connection with modulating devices, it is frequently desirable, particularly with respect to high-power outputs, to operate several tubes in parallel. In such instances, any or all of the tubes 31, 32 and 33 may be considered to represent a plurality of parallelly-connected components, which components may be either separate tubes or components of multipurpose or multipart tubes. Likewise, in the description of the circuit of Fig. 3, the operation will be considered as functioning according to one plan wherein, at the output, a modulated carrier frequency is derived, but since modulation devices are essentially of reversible character it will be understood that the operation may effectively function in the reverse direction. Therefore, in referring herein to a tube or to a plurality of tubes, it will be understood that this may include tubes connected in parallel or separately-functioning thermionic devices wherein the electron flow in different paths is controlled either in separate envelopes or within the single envelope.

Referring now again in particular to Fig. 3, the input modulation signals representing, for instance, detected audio frequencies available upon the conductor 10, are supplied by way of the blocking condenser 38 and across a suitable potentiometer 39, having one terminal thereof connected to ground 17, so as to reach a grid or control electrode 40 (or, for that matter, any cold electrode of the tube 31 as desired). Accordingly, with the signal amplitude controlled by adjustment of the tapping conductor or a contactor 41 with respect to the potentiometer resistance 39 the signal applied to the grid 40 of the tube 31 may be varied. Current flow through the tube 31 will be determined by the supplied input signal with the result that the cathode potential at 34 will rise and fall in accordance with the current flowing through the cathode resistor 37. The plate or anode 42 which is parallelly connected to the anode 43 of the tube 32 is supplied with positive operating potential forming a source (not shown) connected at the terminal point 45 with polarity relative to ground 17 being positive as indicated. The condenser 46 operates as the normal plate bypass condenser.

Concurrently with the application of the modulation potentials upon the tube 31 the filtered carrier input which is available upon the conductor 8 is supplied through the blocking condenser 47 and the potentiometer 48 to tube 32. Potentiometer 48 has its lower terminal connected to ground 17, as indicated. The controlled amplitude of this carrier potential available across the potentiometer resistance 48 to be supplied to tube 32 is obtained at the tapping point 49 and is supplied through the conductor 50 to the grid or other suitable cold electrode 51 of the tube 32.

A carrier input signal voltage is also supplied to the grid or control electrode 51 of the tube 32 by way of a suitable voltage divider 53. In this way the carrier voltage available at the tube 33 is of reduced amplitude relative to that of tube 32. The carrier voltage of reduced amplitude then is fed by way of the conductor 54 from the voltage divider 53 to the control electrode 55 of the tube 33. The voltage divider 53, as represented, is a potentiometer with the sections 53′ and 53″ thereof established by virtue of the point of connection of the slider or contactor element 57. It is apparent that with the slider or contactor 57 connected to the lowermost point of the potentiometer 53, which is indicated as being at ground, the grid or control electrode 55 will also be at ground. For this condition the tube 33 will operate as a cathode follower with a grounded grid. Suitable plate operating potential for the tube 33 is provided from the already mentioned source (not shown) connected at terminal 45, which is supplied to the tube plate or anode 59 by way of the primary winding 60 of the output transformer 61 which primary is suitably tuned by way of the indicated shunt-connected capacity 62.

The described arrangement operates in such a way that the tubes 31, 32 and 33 function as cathode followers and with increasing signals in the positive direction applied at the grid 40 of the tube 31 the cathode thereof, and consequently the cathodes of all the tubes, tend to follow in the same direction. With the carrier input being applied to the grid 51 of the tube 32 the cathode also tends to swing positive on positive half-cycles. Consequently, with the cathode 36 of tube 33 following the operation of the other cathodes by virtue of the common connection, the tube 32 functions as a driver for the output tube 33 and serves to drive the cathode 36 of this tube. With the grid 55 of the tube 33 being connected to receive either a reduced amplitude carrier input from that available at the conductor 8 or operated as a grounded grid tube, it will be apparent that its operation is in opposite phase to that of the tube 32.

With this circuit so functioning part of the carrier output is neutralized by the feed or voltage supplied through the conductor 54 to the grid 55 of the tube 33, to improve the linearity of the amplitude modulation. The general effect is to provide a partial carrier elimination. A reduced degree of modulation is accordingly raised to a higher percentage value.

It will be noted from the described connections that the output from the three-tube combination is obtainable in the output transformer 11 only from the tube 33. Even though the actual applied modulation as available at the conductor 10 from the exalted-carrier or single-sideband adapter 7 (see Fig. 1) may be only of the order of 30% to 50%, the resulting modulation at the output of the tube 33 may be raised to as high as 100%. This procedure is such that only a very low degree of distortion results in the overall modulation system. The output signals from the modulation system herein described then may be derived from the secondary winding 63 of the transformer 11 appropriately tuned by the capacitor 14 to be supplied as indicated by Fig. 1 to the diode 12 for detection. The modulating circuit described by Fig. 3 therefore may be used in connection with the modulation device indicated at any or all places of either Fig. 1 or 2. However, the modulating circuit of Fig. 3 need not be limited in use to the particular circuit shown but may be considered as having general application for any desired form of modulating arrangement.

Various modifications of the herein-described circuit and invention will, of course, be apparent from what has been hereinabove stated.

Having now described the invention, what is claimed is:

1. A diversity combining circuit comprising a plurality of receiving instrumentalities each to receive an incoming signal-modulated wave, local means associated with each receiving instrumentality to create the carrier frequency of each incoming signal wave, modulation detecting means to derive the modulating frequency voltages of the received incoming signal wave, a modulator for modulating the locally created carrier by the detected modulation frequency voltage to develop at each receiving point an amplitude-modulated carrier substantially free from distortion due to selective signal fading, means to detect each locally-developed amplitude-modulated carrier, and a utilization circuit for additively combining the detected locally-amplitude-modulated carrier of each receiver.

2. A diversity combining circuit comprising a plurality of geographically spaced receiving instrumentalities each to receive an incoming signal modulated carrier frequency, means at each receiving instrumentality to create the carrier frequency of each incoming signal wave at an amplitude proportional to the received signal strength of each said wave, means to detect the modulation signal of each incoming carrier frequency, means to remodulate each created carrier frequency by the detected modulation signals to develop an amplitude modulated carrier frequency having a strength proportional to the separate signal strengths, means to detect each developed amplitude modulated carrier, and a circuit for additively combining the detected amplitude modulated carrier from each receiver.

3. A diversity combining circuit comprising a plurality of geographically spaced receiving instrumentalities each to receive an incoming signal modulated carrier frequency, means at each receiving point to produce the carrier frequency of each incoming signal wave at an amplitude proportional to the received signal strength of each said wave, means to detect the modulation signal of each incoming carrier frequency, means to remodulate each produced carrier frequency by the detected modulation signals to develop an amplitude modulated carrier frequency having a strength proportional to the separate signal strengths, a diode to detect each developed amplitude modulated carrier, and a combining circuit connected to receive the detected amplitude modulated carrier from each receiver for additive signal combination.

4. A diversity combining circuit comprising a plurality of receiving instrumentalities each to receive an incoming signal wave, means to select the carrier of each incoming signal wave, means to detect the modulation of each incoming signal wave, means to remodulate the selected carrier by the detected modulation wave to develop an amplitude-modulated carrier, means to detect each developed amplitude-modulated carrier, and a circuit for additively combining the detected amplitude-modulated carrier of each receiver.

5. A diversity receiver comprising a plurality of geographically spaced signal receiving circuits each tuned to receive signal transmissions from a common signal source, a receiver element for filtering the carrier frequency as received on each receiver, means for detecting the modulation frequency on the received carrier at each receiving station, means for locally remodulating a like-value carrier frequency under the control of the detected modulation frequencies, means for detecting the so-modulated carrier frequencies, and means for parallelly combining the detected modulation frequencies.

6. The diversity combining circuit as claimed in the preceding claim wherein a diode is the detecting element for each modulated carrier.

7. A diversity receiving system comprising a plurality of geographically separated receiving elements for receiving phase or single-sideband modulation signals from a transmitter source in diversity combination, a separate filtering means connected with each receiver for deriving the transmitted carrier, means for removing the original modulation frequencies from the received signalling energy at each receiving point, means in each receiver unit for remodulating each filtered carrier frequency under the control of the detected signals to form a double-sideband amplitude-modulated wave, and an adding circuit connected to receive the signal output from all of the demodulators in parallel.

8. A diversity receiving combination claimed in claim 7 wherein each demodulator of the double-sideband modulated carrier comprises a diode.

9. The diversity receiving apparatus claimed in claim 7 comprising, in addition, a low pass filter connected with each demodulator to remove intermediate frequency components from the detected output.

10. The diversity receiving circuit claimed in claim 7 comprising, in addition, a single load resistance for all of the demodulators, means for deriving an automatic volume control voltage for controlling each geographically separated receiver in accordance with the output signals flowing in the feed resistor and a signal utilization circuit connected in parallel with the said automatic volume control output.

11. A diversity receiver combination for reconstructing amplitude modulated signals transmitted upon a selected carrier frequency which comprises a plurality of geographically separated signal receiving instrumentalities each connected to receive the modulated incoming signal wave, means for locally creating the carrier frequency of each incoming signal wave at an amplitude level proportional to the signal strength of the wave received at each geographically separated receiving location, detecting means to derive the modulation of each incoming signal wave, means to remodulate each locally created carrier by the modulation signals to provide signal products of a strength proportional to that of the received rectified signal output to provide a signal modulated wave substantially free from distortion due to selected fading, a diode detector for recovering the original modulation from each of the reconstructed signal modulated waves, and a utilization circuit in which each diode is parallelly included for additively combining the outputs of the several diodes.

12. Diversity receiver apparatus for reproducing signals transmitted as modulations of a selected carrier frequency which comprise at least three geographically separated signal receiving instrumentalities each connected to receive the modulated incoming signal wave, means for locally creating the carrier frequency of each incoming signal wave at an amplitude level proportional to the signal strength of the wave received at each geographically separated receiving location, means to derive the modulation of each incoming signal wave, means to remodulate each locally created carrier by the modulation signals derived to provide signal products of a strength proportional to that of the received rectified signal output to provide a signal modulated wave substantially free from distortion due to selected fading, a diode detector for recovering the original modulation from each of the reconstructed signal modulated waves, and a load circuit to which each diode is parallelly connected for additively combining the several diode outputs.

13. A diversity receiving circuit comprising a plurality of geographically speared instrumentalities each for receiving single-sideband signal transmissions from a transmitting source, means at each receiver for deriving upper and lower sideband outputs from the received signal components, means at each receiver for deriving the carrier frequency of transmission, means connected with each receiving component for modulating the derived carrier by the upper sideband signals, separate means connected with each receiver for modulating the derived carrier by the lower sideband signals, a detecting means connected to reproduce the modulation frequencies of each modulated carrier, means for combining the detected outputs of signals representing the upper sideband frequencies, means for combining the detected outputs of signals representing the lower sideband frequencies, and a separate utilization circuit connected to receive the combined output of the upper and lower sideband frequencies.

14. A diversity receiving circuit comprising a plurality of geographically separated receiving instrumentalities each for receiving single sideband signal transmissions, means at each receiver for deriving upper and lower sideband outputs from the receiver signal components, means for deriving the carrier frequency of transmission, means connected with each receiving component for modulating the derived carrier by the upper sideband signals, separate means connected with each receiver for modulating the derived carrier by the lower sideband signals, a separate detecting means connected to reproduce the modulation frequencies of each of the upper and lower sideband modulated carrier, a circuit for combining the detected outputs of signals representing the upper sideband frequencies, a signal utilization circuit connected to receive the combined upper sideband output, a separate circuit for combining the detected output signals representing the lower sideband frequencies, a signal utilization circuit connected to receive the combined lower sideband output, and means to derive an automatic volume control signal from one of the combined detected output signals.

15. A diversity combining circuit comprising a plurality of geographically-spaced receiving instrumentalities each for receiving an incoming signal-modulated carrier frequency, means at each receiving instrumentality for creating the carrier frequency of each incoming signal wave at an amplitude substantially proportional to that of the received signal strength at each receiving instrumentality, means to detect the modulation signal of each incoming carrier frequency, a frequency changing element at each receiving location comprising three thermionic tubes each including a cathode element and a common connection to all of the cathode elements, a connection to supply the detected modulation signals to one of the tubes, a connection to supply the locally-created carrier to a second of the tubes, and an output circuit connection to receive the output from the third of the tubes so that signals representing a modulation product of the locally-created carrier and the modulation signals appear in the said output circuit, diode detecting means included in the said output circuit for detecting the locally-created amplitude-modulated carrier frequency, and a utilization circuit connected for additively combining the detected amplitude-modulated carrier output from each diode.

16. A diversity receiving system comprising a plurality of geographically separated instrumentalities each for receiving single-sideband signal transmissions from a transmitting source, means at each receiver for deriving separate upper and lower sideband outputs from the received signal components, means at each receiver for deriving the carrier frequency of transmission, and means connected with each receiving component for choosing the derived upper and lower sideband outputs of that receiving instrumentality having the strongest received carrier frequency of transmission.

17. A diversity receiver comprising a plurality of geographically spaced signal receiving circuits each tuned to receive single-sideband signal transmissions from a common signal source, a receiver element for filtering the carrier frequency as received on each receiver, means for detecting the modulation frequency on the received carrier at each receiving station, means for locally remodulating a like-value carrier frequency under the control of the detected modulation frequencies, means for detecting the so-modulated carrier frequencies, and parallel combining means for obtaining a signal output by selecting between the rectified carrier voltage and the total rectified carrier and sideband voltages.

18. A diversity receiving system comprising a plurality of geographically separated receiving elements for receiving phase or single-sideband modulation signals from a transmitter source in diversity combination, a separate filtering means connected with each receiver for deriving the transmitted carrier, means for removing the original modulation frequencies from the received signalling energy at each receiving point to provide separate upper and lower sideband outputs, means in each receiver unit for remodulating each filtered carrier frequency under the control of the detected signals to form a double-sideband amplitude-modulated wave, and an output circuit including adding means for receiving the signal outputs to select between the rectified carrier voltage and the total rectified carrier and sideband voltages.

References Cited in the file of this patent

UNITED STATES PATENTS

| | | |
|---|---|---|
| 2,219,749 | Oswald | Oct. 29, 1940 |
| 2,219,751 | Polkinghorn | Oct. 29, 1940 |
| 2,333,335 | Peterson | Nov. 2, 1943 |
| 2,414,111 | Lyons | Jan. 14, 1947 |
| 2,432,720 | Brown | Dec. 16, 1947 |
| 2,499,568 | Bucher | Mar. 7, 1950 |
| 2,510,889 | Hollingsworth | June 6, 1950 |